T. V. PLICE.
DOOR LATCH AND CONTROLLING DEVICE FOR COMBINED HINGE AND SLIDE DOORS.
APPLICATION FILED JULY 10, 1920.
Reissued Aug. 31, 1920. 14,945.
2 SHEETS—SHEET 1.
Fig. 1.
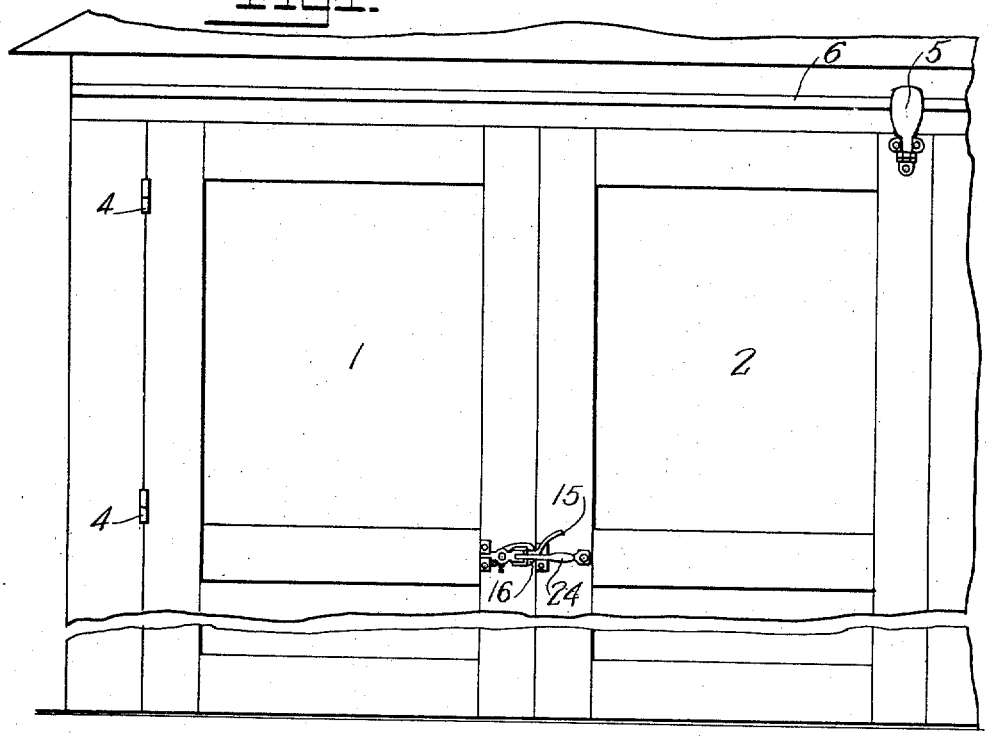
Fig. 2.
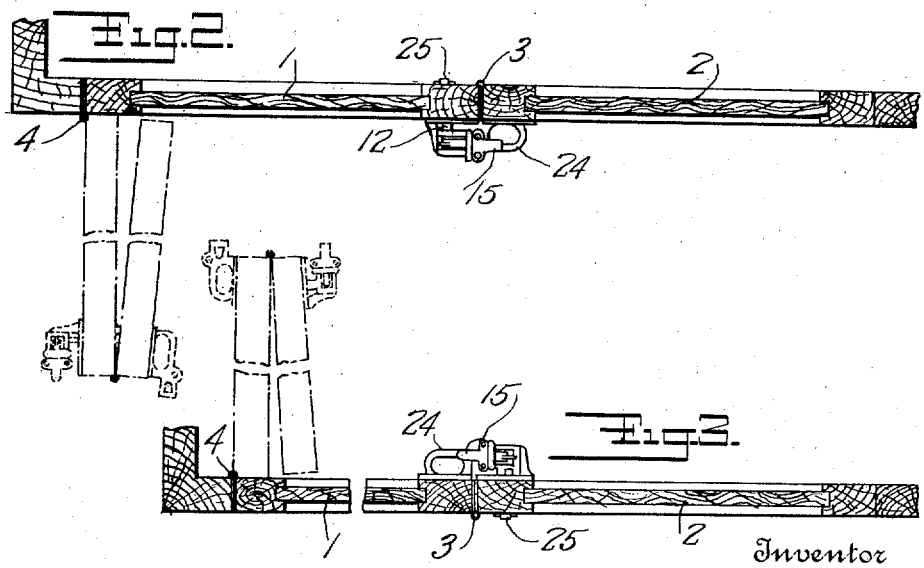
Fig. 3.
Inventor
Thomas V. Plice
By his Attorneys
Mitchell & Allyn

T. V. PLICE.

DOOR LATCH AND CONTROLLING DEVICE FOR COMBINED HINGE AND SLIDE DOORS.

APPLICATION FILED JULY 10, 1920.

Reissued Aug. 31, 1920. 14,945.

2 SHEETS—SHEET 2.

Inventor

Thomas V. Plice

By his Attorneys

Wilcox & Allyn

UNITED STATES PATENT OFFICE.

THOMAS V. PLICE, OF ASHLAND, OHIO, ASSIGNOR TO THE TOPPING MANUFACTURING CO., OF ASHLAND, OHIO, A CORPORATION OF OHIO.

DOOR-LATCH AND CONTROLLING DEVICE FOR COMBINED HINGE AND SLIDE DOORS.

14,945. Specification of Reissued Letters Patent. Reissued Aug. 31, 1920.

Original No. 1,341,583, dated May 25, 1920, Serial No. 348,357, filed December 30, 1919. Application for reissue filed July 10, 1920. Serial No. 395,386.

*To all whom it may concern:*

Be it known that I, THOMAS V. PLICE, a citizen of the United States of America, residing at Ashland, in the county of Ashland, State of Ohio, have invented a new and useful Door-Latch and Controlling Devices for Combined Hinge and Slide Doors, of which the following is a specification.

My invention relates to locking and controlling mechanism for doors, and is particularly applicable to doors of the combined sliding and swinging type, such as used on garages and stables.

The chief object of my invention is to provide simple means whereby the doors may be effectively locked or latched in the closed position, said means being easily reversible, and said means being so constructed that it may be used to facilitate the opening of the doors. Other advantages not specifically mentioned will be apparent to a mechanic familiar with this art from a reading of the following description and an examination of the accompanying drawings in which:

Figure 1 is a front view of a pair of hinged doors arranged to both swing and slide from the closed position shown, to the open position illustrated in dotted lines in Fig. 2.

Fig. 2 is a sectional view of the parts shown in Fig. 1 looking down.

Fig. 3 is a view similar to Fig. 2, but showing the doors arranged to swing inwardly instead of outwardly, as shown in Figs. 1 and 2.

Figure 6:
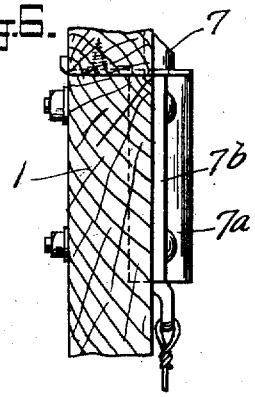
Fig. 6 is an edge view of a door equipped with my invention.

I will first describe that type of a door to which my improved locking means is particularly adaptable. In Figs. 1 and 2, I have shown a two section door the two sections being indicated at 1—2. These sections are hinged together at 3, while the section 1 is hinged to the door casing at 4. 5 is a swivel hanger of any suitable construction secured to the upper edge of the door to run along a track 6. The hanger 5 serves to support the free edge of the two door sections 1—2. The hinges 3—4 are arranged on opposite sides of the door. In the form shown in Figs. 1 and 2, the door sections are intended to buckle outwardly so that they will fold back into the position indicated in dotted lines. In Fig. 3 the aforesaid hinges are reversely arranged so that the door will buckle inwardly and fold back into the position shown in dotted lines in said figure. When the doors buckle outwardly, the latch portion of my invention will be located on the outside of the door, and when the doors are arranged to buckle inwardly, the latch is arranged on the inside of the door sections. The latch is constructed to automatically operate when the doors are closed so as to hold the two sections in line. Frequently such doors are equipped with an overhead spring latch bolt which snaps into a keeper plate in the upper part of the door casing. Such a bolt is indicated at 7 in Fig. 6. My locking mechanism is so arranged that the act of unlatching the door will automatically operate to retract the aforesaid overhead latch bolt.

My automatic latch mechanism comprises the following parts:—

Figure 4:
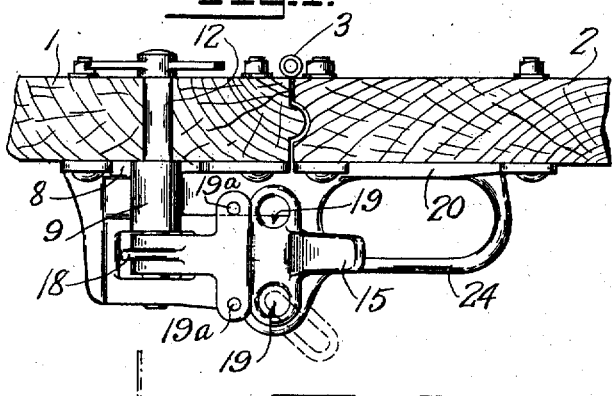
Fig. 4 is a relatively enlarged plan view of my invention with portion of the doors shown in section.
Figure 5:
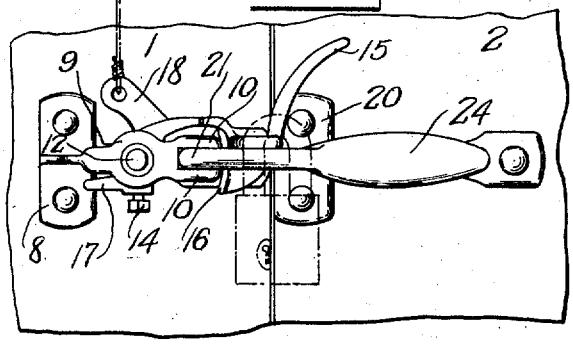
Fig. 5 is a front elevation of the parts shown in Fig. 4.
Figure 5:
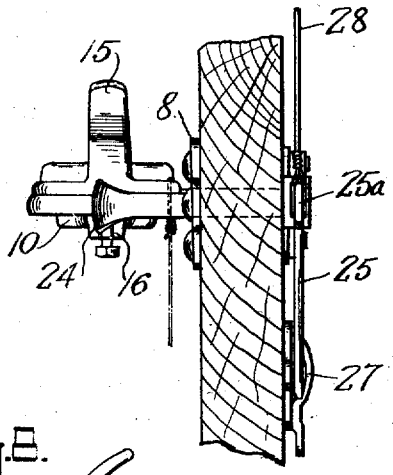
Figure 7:
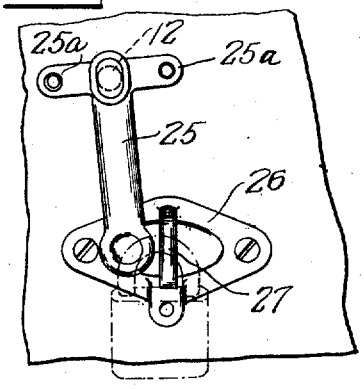
Fig. 7 is a front elevation of certain details.
Figure 8:
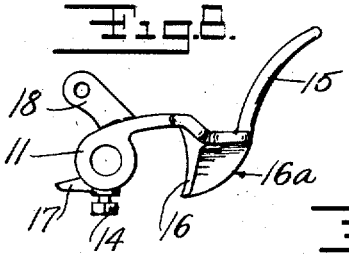
Figs. 8, 9 and 10 are views of detached details.
Figure 9:
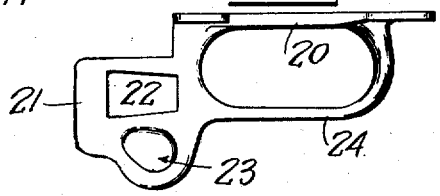
Figure 10:
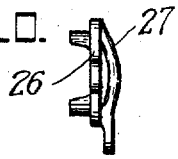

8 is the base of a latch carrying frame designed to be screwed or bolted to either one of the door sections adjacent to the break between said sections, and on the opposite side from the hinge thereat. In Fig. 4 I have shown said base as secured to the section 1. Projecting outwardly from the base is a center bearing 9. 10—10 are horizontally located spaced jaws at one side of said center bearing forming a socket for the tongue 21 later described. The center bearing is cut away directly behind the jaws 10—10 to provide room for the hub 11 of a swinging latch. 12 is a shaft or spindle which passes through the door section 1, and through the center bearing 9, and through the hub 11 of the latch. 14 is a set screw by which the hub may be locked on the shaft or spindle 12. 15 is a handle at the outer end of the latch by which said latch may be lifted. 16 is the nose of the latch, the side of said nose nearest the hub 11 furnishes an abrupt wall for performing the latch function, while the opposite side of said nose is beveled as indicated at 16[a]. 17 is a stop on the hub 11 of the latch. 18 is an arm projecting upwardly and rearwardly from the body of the latch near the hub, the function of which arm will be later explained. The nose of the latch is arranged to drop down by gravity in front of the jaws 10—10 as best seen in Fig. 5. That part of the latch between the handle 15 and the hub 11 may be extended laterally to provide in effect wings, each of which is preferably provided with two passages or holes 19[a] at its opposite side edges. The upper and lower sides of the frame upon which the latch is mounted both correspond, so that the latch may be associated with the frame on either side, said latch being detached therefrom, simply by loosening up on the set screw 14 and pulling out the spindle 12. To attach the latch, the hub of the same is put into place as shown in Fig. 4 on the desired side of the frame. The spindle is then re-inserted through the center bearing 9 and the hub 11, and the set screw again set up. The other section of the latch mechanism which is attached to the other section 2 of the door comprises a suitable base 20, (see Fig. 9) which is adapted to be screwed or bolted to the door section 2 in front of the latch proper. Projecting outwardly from the base 20 is a frame which includes a forwardly projecting horizontally positioned male member or tongue 21, arranged to project into the space between the jaws 10—10 when the door sections are straightened out. 22 is a recess or hole in the tongue into which the nose 16 of the latch drops so as to lock together both sections of the latch mechanism and hold the door sections in the straightened out position. Projecting laterally from the tongue is a wing which is provided with a hole or passage 23, which is arranged to line up with the outside hole or passage 19 of the latch, so that the hasp of a padlock may be passed through these holes 19—23 to positively lock the latch in its holding position. 24 is a loop extending outwardly from the base 20 and forwardly to the tongue 21 to form a hand-hold, said loop also bracing and strengthening the parts. On the opposite side of the door from the latch proper is located a handle or lever 25, which is properly secured to the end of the spindle 12, so that by swinging said lever the latch may be operated from that side. This lever 25 has one or two offsets 25[a] each forming in effect a bell crank lever which may be used for operating an overhead bolt in the manner hereafter described. 26 is a keeper plate mounted on the door adjacent to the free end of the lever 25, the said keeper plate having an offset bar 27. The end of the lever 25 may have a hole therein, so that the hasp of a padlock may be passed through the same and under the keeper bar 27 to lock the latch on that side of the door. The overhead spring latch bolt 7 is mounted in a suitable case 7[a], which may be secured to the door section upon which the aforesaid latch is located. The tail of this spring latch bolt 7 may be connected by a chain or wire 28 with the arm 18 of the latch (or with one of the bell cranks 25[a] of the lever 25) so that when the latch proper is lifted, it will simultaneously and automatically retract the spring latch bolt 7 thereby at once unlocking the two door sections 1—2 so that they may be buckled, and unlocking the door sections from the overhead casing to permit said buckling of the door sections. In the drawings, Fig. 6, I have shown the spring latch bolt 7 as connected by wire to the bell crank arm of the lever 25, because in that particular figure, the door is intended to buckle outwardly, and obviously the latch bolt 7 should always be on the indoor side. If the door were designed to buckle inwardly, then the latch mechanism would be located on the inside of the door underneath the spring latch bolt 7, and the wire 28, in that event, would be connected with the arm 18 of the latch. If the door had a lower bolt corresponding to the bolt 7, its connecting wire would be connected to the latch through the hole 19[a]. If it were desired to have a spring latch bolt in the lower edge of the door to take into a keeper on the door sill, it is obvious that such an arrangement could be provided, in which event another latch bolt 7 like that shown in Fig. 6 would be provided for the lower edge of the door. No separate illustration is required because this mere duplication is perfectly obvious.

When the doors stand ajar, as shown in dotted lines of Fig. 2, they may be easily closed by grasping the hand-hold 24 and pulling the same to the right as viewed in said figure. As the doors straighten out, the edge of the tongue 21 engages the beveled edge 16[a] of the latch, so as to automatically lift the same. It then enters the socket space between the jaws 10—10, so that the doors will be held against independent vertical movement and so that when the doors are fully straightened out, the nose 16 of the latch will drop down into the hole 22 so as to securely hold the door sections in the straightened out or in closed position shown in solid lines Fig. 2. The stop 17 serves to hold the latch in the proper position when the doors are buckled, so that when said doors are closing, the tongue 21 will properly engage the bevel 16[a] to lift the latch. The case 7[a] for the latch bolt 7 is of cylindrical form, and is provided at diametrically opposite edges with two corresponding flanges, one of which is shown at 7[b]. The flanges receive the bolts or screws by which the case is secured to the door, the door being recessed sufficiently to afford clearance for the rear side of the case $7^a$. By this arrangement only about one-half of the case projects beyond the surface of the door, with the result that the doors may be folded back until they are practically parallel and close together. This construction of the latch bolt case $7^a$ is of substantial advantage, because otherwise, if the whole of said case stood above the surface of the door, it would tend to limit the degree to which the doors could be brought together when folded back.

It will be understood that I have shown and described my invention only in its preferred form, and that I fully appreciate that various modifications in the design and arrangement of parts may be had without departing from the spirit and scope of my invention.

What I claim is:—

1. In a door locking mechanism, two complementary latchable frames, a horizontally positioned tongue carried by one frame, jaws on the other frame forming a socket for the tongue, and a horizontally pivoted latch member carried by said other frame for detachably engaging said tongue, said tongue operating to lift said latch upon a door closing movement.

2. In a structure such as referred to in claim 1, in which the latch member is provided with a beveled front edge to co-act with the tongue whereby the latter may lift the latch as the frames approach each other.

3. In a structure such as defined in claim 2, with means to support the latch when the frames are separated to hold the latch in proper position to permit the tongue to engage and lift the same.

4. In a structure such as defined in claim 3, in which the supporting means for the latch comprises a stop on the hub of the latch arranged to engage an adjacent portion of the frame.

5. In a structure such as defined in claim 1, with a coöperating latch bolt, and means for connecting the latter to the first mentioned latch mechanism, whereby the operation of disengaging the latch mechanism will simultaneously engage the latch bolt.

6. In a structure such as defined in claim 5, the said connecting means including an arm on the pivoted latch member.

7. In a structure such as defined in claim 1, with a lateral offset on the pivoted latch member near its free end, and another lateral offset on said tongue near its free end, said offsets having registering holes, whereby the same may be locked together by means of a padlock hasp or the like, when the latch is in engagement with the tongue.

8. In a structure such as defined by claim 5, said connecting means including a spindle arranged to pass through the door to which the latch mechanism is applied, and a bell crank lever on the end of the spindle opposite said latch mechanism all constructed whereby the pivoted latch may be lifted from either side of the door.

9. Locking mechanism for two door sections including a hinge for connecting said two door sections, the hinge pivot being located at one side of said door sections, latch mechanism arranged to be attached to the said door sections on the opposite side from the hinge pivot and coöperating therewith to hold the doors locked in alinement, said latch mechanism including two complementary frames, one of said frames having a horizontal tongue, the other frame having a horizontally positioned socket to receive the tongue, and also having a latch arranged to interlock with said tongue when the doors to which the mechanism is applied are in alinement.

10. In a structure such as defined in claim 9, with a latch bolt arranged to be mounted on the door carrying the pivoted latch member, with a connecting means between said latch bolt and pivoted latch mechanism whereby the retraction of the latter will retract the former.

11. In a structure such as defined in claim 9, with an offset loop on the frame carrying the tongue, said loop forming a brace for the tongue and a hand hold.

THOMAS V. PLICE.